US008006646B2

(12) United States Patent
Grad (10) Patent No.: US 8,006,646 B2
(45) Date of Patent: Aug. 30, 2011

(54) SELF CLEANING AQUARIUM SYSTEM

(76) Inventor: Andrew Grad, Cambridge, MA (US)

(*) Notice: Subject to any disclaimer, the term of this patent is extended or adjusted under 35 U.S.C. 154(b) by 813 days.

(21) Appl. No.: 11/869,917

(22) Filed: Oct. 10, 2007

(65) Prior Publication Data

US 2008/0251028 A1    Oct. 16, 2008

Related U.S. Application Data

(60) Provisional application No. 60/851,209, filed on Oct. 12, 2006.

(51) Int. Cl.
*A01K 61/00* (2006.01)
(52) U.S. Cl. .......................................... 119/259; 119/249
(58) Field of Classification Search .................. 119/259, 119/249, 263, 264, 245, 257
See application file for complete search history.

(56) References Cited

U.S. PATENT DOCUMENTS

| | | | |
|---|---|---|---|
| 460,809 A | 10/1891 | Gunther | |
| 3,814,254 A * | 6/1974 | Schatz | 210/167.23 |
| 4,220,530 A * | 9/1980 | Gabriele | 210/86 |
| 4,684,462 A * | 8/1987 | Augustyniak | 210/97 |
| 4,861,465 A * | 8/1989 | Augustyniak | 210/109 |
| 4,913,811 A | 4/1990 | Huang et al. | |
| 5,121,708 A * | 6/1992 | Nuttle | 119/200 |
| 5,290,437 A | 3/1994 | Lin | |
| 5,560,318 A * | 10/1996 | Yoshida et al. | 119/248 |
| 5,605,115 A * | 2/1997 | Dale | 119/249 |
| 5,640,930 A | 6/1997 | Kirby | |
| 5,647,983 A | 7/1997 | Limcaco | |
| 5,690,054 A | 11/1997 | Allen | |
| 5,849,185 A | 12/1998 | Judy | |
| 6,436,295 B2 * | 8/2002 | Kim | 210/703 |
| 6,533,928 B1 * | 3/2003 | Terato | 210/167.27 |
| 6,641,718 B2 * | 11/2003 | Lari et al. | 210/124 |
| 6,755,981 B2 * | 6/2004 | Terato | 210/805 |
| 6,808,625 B1 * | 10/2004 | Wu | 210/221.2 |
| 7,604,734 B2 * | 10/2009 | Smith | 210/167.22 |
| 7,611,130 B2 * | 11/2009 | Sylvester | 261/26 |
| 2004/0251186 A1 | 12/2004 | Ohanian | |

* cited by examiner

*Primary Examiner* — Yvonne R. Abbott
(74) *Attorney, Agent, or Firm* — QuickPatents, Inc.; Kevin Price (57) ABSTRACT

An aquarium system for containing water and aquatic life therein is disclosed that includes a reservoir and an aquarium that is mounted generally above the reservoir. The aquarium has an outlet in liquid communication with the reservoir through an outlet conduit that includes a discharge mechanism, preferably an inverted U-shaped siphon conduit, that periodically discharges a portion of the water from the aquarium to the reservoir therethrough once the water has reached a maximum water level. A pumping mechanism pumps water from the reservoir up to the aquarium through an inlet conduit that is in fluid communication with the reservoir and an inlet of the aquarium. As such, when the water reaches the maximum level in the aquarium, the siphon conduit substantially fills with water which begins to flow out through the outlet conduit, drawing a portion of water from the aquarium rapidly through the outlet conduit until the water in the aquarium reaches the open bottom end of the siphon conduit. Air in the aquarium thereafter enters the siphon conduit to break the siphon. Water leaving the output conduit enters a filter means to filter and clean the water before it is returned to the aquarium by the pump. An embodiment emulates the current of a river, wherein the aquarium takes the shape of an elongated, substantially transparent tube or trough. A wave surge mechanism may be included for producing periodic wave surges in the aquarium.

18 Claims, 8 Drawing Sheets

SELF CLEANING AQUARIUM SYSTEM

CROSS-REFERENCE TO RELATED APPLICATIONS

This application claims the benefit of U.S. Provisional Patent Application 60/851,209, filed on Oct. 12, 2006, and incorporated herein by reference.

STATEMENT REGARDING FEDERALLY SPONSORED RESEARCH AND DEVELOPMENT

Not Applicable.

FIELD OF THE INVENTION

This invention relates to fish aquariums, and more particularly to a self-cleaning aquarium that emulates natural water flows for aquatic life.

BACKGROUND AND DISCUSSION OF RELATED ART

Displaying fish in an aquarium has been a popular hobby throughout the world for hundreds of years. The first glass aquariums were constructed in the 1800's. Since that time the basic design of the fish aquarium has changed little. Fish are to this day kept most frequently in a tank of water which has a relatively small viewing area in relation to the volume of water contained therein. Aquariums are almost always illuminated from above, which prevents viewing the fish from above, which is how fish are almost always observed in nature. Almost all fish tanks are the same generally cylindrical or rectangular shape. The modern fish tank is typically made of acrylic instead of glass, it may have a filtration system on top instead of on the side or bottom, but it remains simply a standing tank of water.

The natural habitat of most fish is not a standing body of water. Modern aquariums do an inadequate job mimicking the environment of stream and river-dwelling fish. It is difficult and expensive to mimic a coastal reef environment in any commercially available aquarium. Moreover, no low-cost, simple-to-operate and maintain, and energy efficient aquarium is available that replicates a coastal environment replete with waves and sandy shore.

The present invention accomplishes all of the above in a simple, inexpensive and elegant manner. It allows a fish hobbyist to add an additional, visually exciting aquarium at a minimal cost to an existing, traditional aquarium. Because of its low weight per length it can be easily suspended from most ceilings, providing a stunning and unique display. The aquarium length can range from a foot to more than one hundred feet, as desired. It is self-cleaning due to its directional current and the frequent, nearly complete, exchanges of water. Because there is such a high rate and percentage of water exchange, an unusually large number of fish per gallon of water can thrive in the aquarium of the present invention.

This invention is the outgrowth of experiments to construct a working, closed circuit tubular aquarium. By the fall of 2001 I had a functioning tubular aquarium, but I could not find simple solutions to several aspects of maintaining a healthy environment. For example, while I could easily introduce fish to the aquarium, I could not easily remove a fish without dismantling much of the prototype. Over time, air dissolved in the aquarium water escapes and forms increasingly larger air bubbles, especially in horizontal sections of tubing. These air bubbles interfere with water flow and are difficult to remove.

At approximately this time I did a patent search for tubular aquariums. I came across U.S. Pat. No. 5,605,115 issued to Dale on Feb. 25, 1997. When I examined the drawings and specifications, I saw that my tubular aquarium was a substantial improvement in simplicity and functionality, yet my design at the time was still too impractical for sale.

Later in the year I decided to rethink the concept of the tubular aquarium. I wanted to keep the aspects of it that were so appealing: fish swimming long distances, maximized viewing area, and the choice of mounting on a wall or hanging from a ceiling.

I deconstructed the tubular aquarium into its simplest components, namely, a length of tubing, water entering one end of the tube, and water draining from the other end of the tube. To get the water to drain from the tube, I angled the tube slightly upward. Doing so caused the inflowing water at the upper end to run down the tube in the manner of a stream or river. While I was experimenting with various drain options I discovered I could make use of the siphon effect in a novel way if I positioned the reservoir below the aquarium. While a periodic drain pump can mimic the effect of a drain siphon, a siphon is simple, foolproof and inexpensive. A siphon will not stress or harm beneficial microorganisms such as plankton the way a pump can. Using a siphon in different configurations allows the aquarium to replicate natural stream, river, reef and seashore environments. Another modification of the siphon creates a healthy environment for many times the usual limit of fish compared with a non-modified standard aquarium.

As the water in the aquarium rises, at a predetermined water level the siphon self-primes and empties the aquarium. The amount of water left in the aquarium is predetermined by the height of the siphon's open end inside the aquarium, or by an opening elsewhere in the siphon assembly, which breaks the siphon effect as soon as the water in the aquarium empties to that level and air enters. The water left in the aquarium is important to the well being of the fish. It remains a relatively quiet pool of water where the fish can rest when not swimming with or against the water inflow.

The rate at which water enters the upper end of the aquarium is easily controlled by adjustment of pump-size, flow-rate, inflow tubing diameter, and/or by partially compressing the inflow tubing to restrict water flow. The rate at which the siphon drains the aquarium is easily controlled by the configuration and size of the siphon's open end, the diameter of the siphon, the diameter of the drain tubing attached to the siphon, and/or by restricting the drain tubing to decrease water outflow.

The frequent, near total exchange of water in the aquarium eliminates almost all of the waste that would normally accumulate in the corners and along the bottom of traditional aquariums. As such, fish are minimally exposed to their own waste. There is no portion of the aquarium in which unhealthy microorganisms can reproduce in stagnant water. Cleaning needs to be performed much less frequently and takes relatively little time. The self-cleaning attribute of this invention was a serendipitous result of the redesign of the aquarium.

Cleaning aquariums is an unpleasant chore for most aquarium owners. Cleaning is necessary to ensure a healthy aquatic environment. Aquarium filters cannot remove all of the waste and debris, and thus periodic aquarium cleanings are required.

A number of inventions address this need for periodic aquarium cleaning. All of these inventions, including U.S. Pat. No. 4,913,811 issued to Huang, et al., U.S. Pat. No.

5,640,930 issued to Kirby, U.S. Pat. No. 5,690,054 issued to Allen, U.S. Pat. No. 5,290,437 issued to Lin and U.S. Pat. No. 460,809 issued to Gunther, as well as other prior art devices, require complex filtering systems or vacuuming units to clean the bottom to remove settled waste. U.S. Pat. No. 5,849,185 issued to Judy, and U.S. Patent Application No. 20040251186 submitted by Ohanian, detract from the natural beauty of an aquarium.

All, except U.S. Pat. No. 5,849,185 issued to Judy, are relatively expensive to manufacture. The Judy device needs to be cleaned periodically itself because it sits inside the fish tank and filth and algae accumulate along its walls. In addition, it substantially reduces the viewing area of the aquarium.

Because commercially sold aquariums do not provide for automatic and frequent exchange of large volumes of water, waste is left trapped in corners and close to the surface. None of the above referenced prior art removes waste and debris floating in the water unless it is already very near the bottom of the aquarium.

Referring again to U.S. Pat. No. 5,605,115 issued to Dale, such a device is far from an ideal environment for keeping fish. For example, there is no simple way to remove a fish if it is dead, diseased, or injured. Waste accumulates at the bottom of the horizontal sections of such a device, and there is no way provided for its removal except for the circulation of the water through the tubing. From testing, the rate of water flow required to flush away the waste is high enough to be detrimental to the health of most fish. One other problem not addressed in the Dale patent is the removal of air pockets in sections of the tubing. Over time air that is dissolved in the aquarium water escapes and forms increasingly large air bubbles, especially in horizontal sections of tubing. These air bubbles interfere with water flow and are difficult to remove. There is no solution offered to this problem in the Dale disclosure.

U.S. Pat. No. 5,647,983 is an aquarium system designed for the treatment of aquarium water. It is another example of a piecemeal solution to designing an integrated aquarium system. U.S. Pat. No. 5,647,983 does not address the less than natural environment inside the aquarium. The aquarium is a modification of a standard aquarium without providing an enhanced habitat. The modifications required also detract from the aesthetic qualities of even a standard aquarium. The preferred implementation of U.S. Pat. No. 5,647,983 is as a salt water aquarium but the need for water pumps to achieve wave and current flow inside the aquarium is not addressed. The plankton that are spared in the stand alone filter will be harmed once they flow into the aquarium and are sucked into one of the necessary pumps. In the instant invention there is only a single water pump that pumps water from the bottom of the reservoir into the aquarium. Plankton or other beneficial floating organisms remain safe in the reservoir, not needing to pass through the water pump.

The rotating filter wheel in U.S. Pat. No. 5,647,983 doubles as the mechanism to transfer water between the reservoir and the aquarium. This is an inefficient transfer mechanism that requires that the reservoir be placed close to and at nearly the same level as the aquarium. Such a system detracts from the aesthetic value of the aquarium, and even with the reservoir placed in close proximity to the aquarium it still is not be able to provide a high rate of water exchange.

In addition, in U.S. Pat. No. 5,647,983 Limcaco does not address the problem of how to increase the percentage of water in the aquarium that is filtered on a regular basis. There is nothing in such an aquarium system that minimizes stagnant areas of water within the aquarium. U.S. Pat. No. 5,647,983 is described as an aquarium system while it is in essence a filtering system requiring special connections and other modifications to a standard aquarium.

Prior art devices have addressed either improving the aquarium or the filtration of aquarium water. However, the prior art devices each generally improve upon only one or two small aspects of an aquarium system. Clearly, then, there is a need for an aquarium system that improves upon the prior art by providing:

1. Greater ratio of viewing area to water volume;
2. Enhanced viewing experience watching fish interact in a more natural environment;
3. The ability to view fish from the unusual perspectives of from the top down, from the bottom up, and from end to end;
4. Simplicity of design, requiring only one moving part: the impeller inside a single water pump;
5. An uncluttered aquarium design, as equipment such as filters and heaters are set up in the reservoir which can be hidden from view;
6. Lower operating costs, as only a single pump is required, and the filters in the reservoir are powered by downward water flow when the aquarium periodically drains by gravity;
7. Greatly increased number of fish that can be well-maintained therein compared to any other aquarium with the same volume of water;
8. Improved physical and mental health of fish due to emulation of a more natural aquatic environment;
9. A reservoir that acts as a giant buffer, maintaining a stable temperature and high water quality in the aquarium; and
10. With micro-chip controlled LED lighting at one or both ends of the tube-shaped aquariums, the aquariums become a decorative light sculpture with ever changing hues reflecting off the fish.

The present invention accomplishes these objectives.

SUMMARY OF THE INVENTION

The present device is an aquarium system for containing water and aquatic life therein. The aquarium system includes a reservoir and an aquarium that is mounted generally above the reservoir. The aquarium has an outlet in liquid communication with the reservoir through an outlet conduit. The outlet is located at a maximum water level inside the aquarium, such that once water reaches and begins to exceed the maximum water level it flows out of the outlet conduit. The outlet conduit includes a discharge means that periodically discharges a portion of the water from the aquarium to the reservoir therethrough once the water has reached the maximum water level.

Preferably the discharge means includes an inverted generally U-shaped siphon conduit that has an open bottom end that is in fluid communication with the outlet conduit. The siphon conduit is adapted to establish a siphon when the water in the aquarium reaches the predetermined maximum level established by the location of the outlet. As such, with the aquarium fixed generally vertically higher than the reservoir, when the water reaches the maximum level in the aquarium, the siphon conduit substantially fills with water which begins to flow out through the outlet conduit, drawing the portion of water from the aquarium rapidly through the outlet conduit until the water in the aquarium reaches the open bottom end of the siphon conduit. Air in the aquarium thereafter enters the siphon conduit to break the siphon.

An electric water pump or the like is included for pumping water from the reservoir up to the aquarium through an inlet conduit that is in fluid communication with the reservoir and an inlet of the aquarium. A filter means may be located in fluid communication between the outlet conduit and the reservoir, such that water discharged from the aquarium is filtered before being introduced into the reservoir.

In one embodiment of the invention, the aquarium takes the shape of an elongated, substantially transparent tube or trough with an open top. In such an embodiment, the aquarium may be mounted non-horizontally such that the outlet is positioned proximate a lower end of the aquarium. As such water flows generally from the inlet to the outlet through the tube, creating a current through the tube that emulates natural water flow conditions for the aquatic life.

A wave surge means may be included for producing periodic wave surges in the aquarium. The raised end of such an embodiment includes a sand layer onto which wave surges break after forming into waves.

The present invention provides 1) greater ratio of viewing area to water volume; 2) enhanced viewing experience watching fish interact in a more natural, frequently moving environment; 3) the ability to view fish from the unusual perspectives of from the top down, from the bottom up, and from end to end; 4) simplicity of design, requiring only one moving part: the impeller inside a single water pump; 5) an uncluttered aquarium design, as equipment such as filters and heaters are set up in the reservoir which can be hidden from view; 6) lower operating costs, as only a single pump is required, and the filters in the reservoir are engaged by downward water flow when the aquarium periodically drains by gravity; 7) a greatly increased number of fish that can be well-maintained therein compared to any other aquarium with the same volume of water; 8) improved physical and mental health of fish due to emulation of a more natural aquatic environment; 9) a reservoir that acts as a relatively large buffer, maintaining a stable temperature and high water quality in the aquarium; 10) ability to emulate reef and near-shore environments; 11) ability to be used with both fresh and salt water environments; and 12) a decorative light sculpture with ever changing hues reflecting off the fish when used with micro-chip controlled LED lighting at one or both ends of the tube-shaped aquariums. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
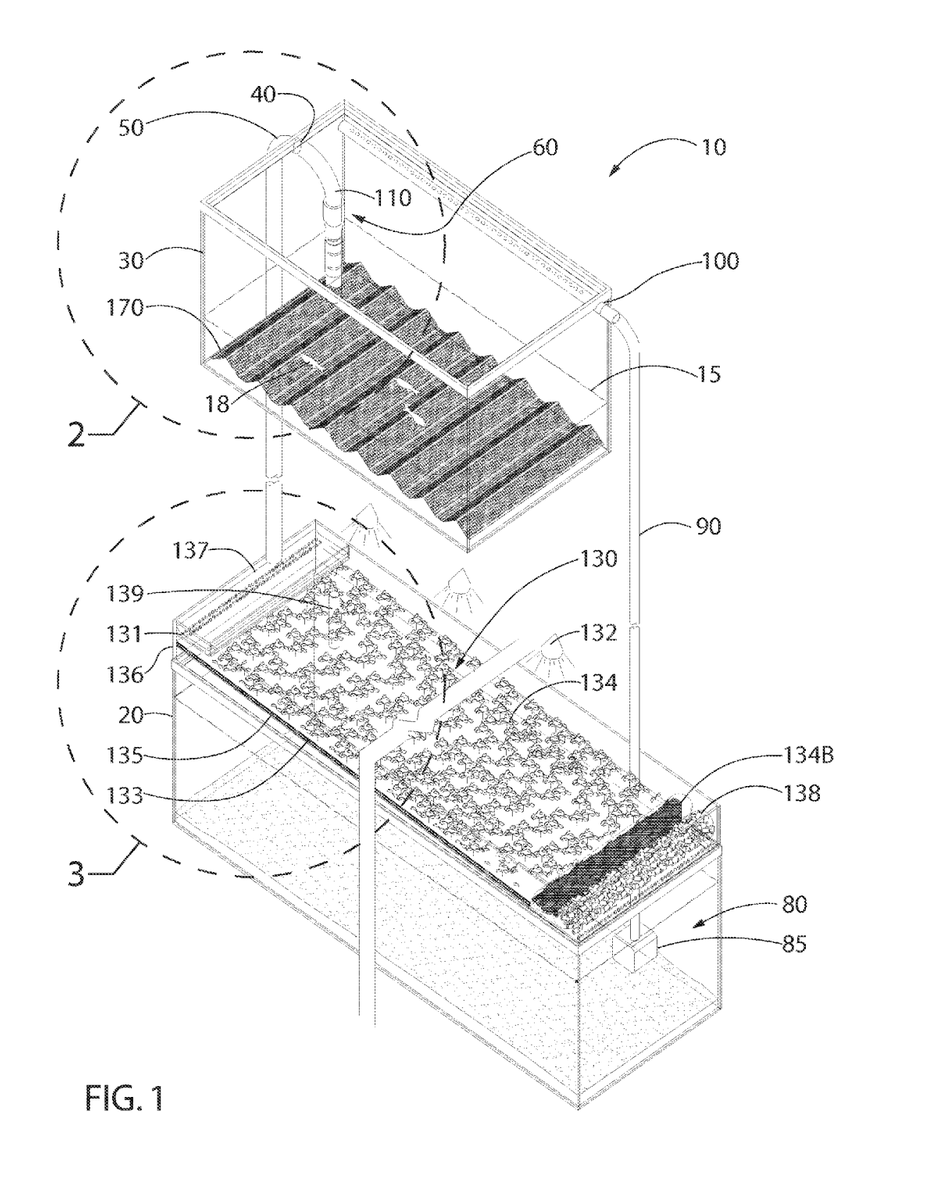
FIG. 1 is a perspective view of a first embodiment of the invention.
Figure 2:
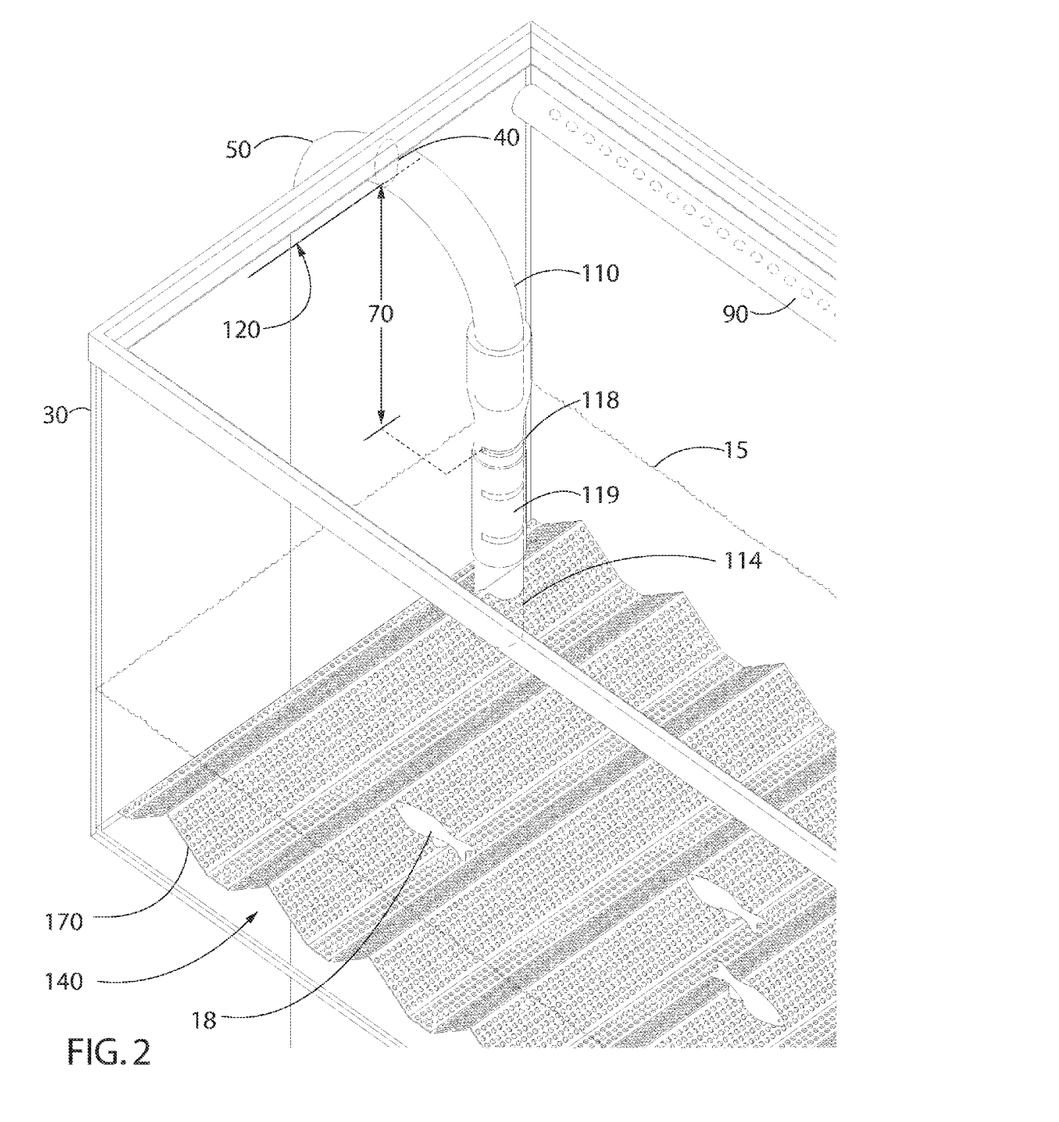
FIG. 2 is a partial perspective view of the first embodiment of the invention, taken along lines 2-2 of FIG. 1.
Figure 3:
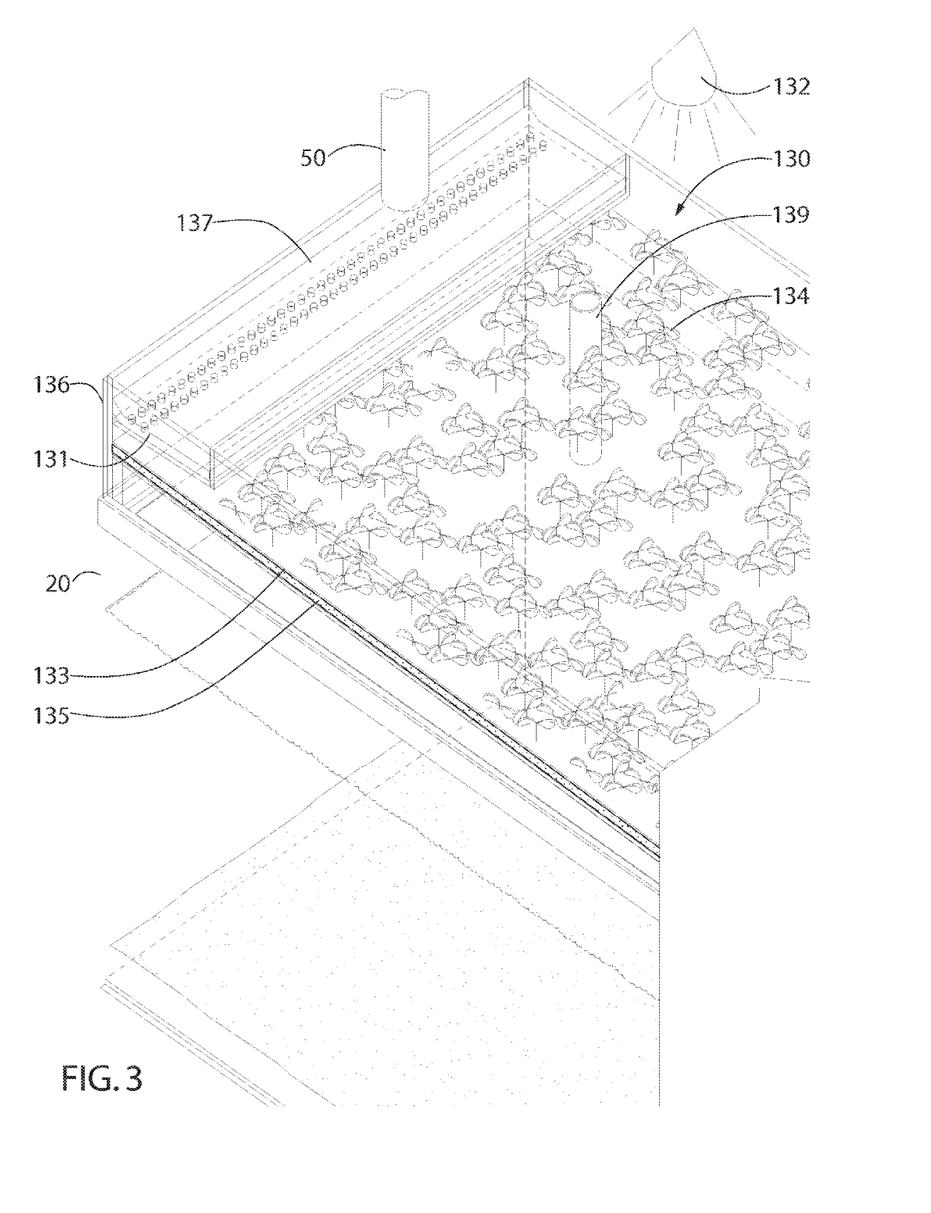
FIG. 3 is a partial perspective view of the first embodiment of the invention, taken along lines 3-3 of FIG. 1.

FIGS. 1-3 illustrate a first embodiment of an aquarium system 10 for containing water 15 and aquatic life 18 therein.

The aquarium system 10 includes a reservoir 20 and an aquarium 30 that is mounted generally above the reservoir 20. The aquarium 30 and the reservoir 20 may be mounted together as part of the same unit (not shown), or separately mounted, provided that the aquarium 30 is fixed generally above the reservoir 20 so as to allow siphoning of the water 15 from the aquarium 30 to the reservoir 20 as described in more detail below. The aquarium 30 and the reservoir 20 are both capable of water-tight containment of liquids, and can be formed in any desired shape and of any suitable material, such as acrylic, polycarbonate, glass, plastic (either opaque, translucent or transparent, as desired), or the like.

The aquarium 30 has an outlet 40 in liquid communication with the reservoir 20 through an outlet conduit 50. The outlet 40 is located at a maximum water level 120 inside the aquarium 30, such that once water 15 reaches and begins to exceed the maximum water level 120 it flows out of the outlet conduit 50. The outlet conduit 50 includes a discharge means 60 that periodically discharges a portion 70 of the water 15 from the aquarium 30 to the reservoir 20 therethrough once the water 15 has reached and begins to exceed the maximum water level 120.

A pumping means 80, such as an electric water pump 85 or the like, is included for pumping water 15 from the reservoir 20 up to the aquarium 30 through an inlet conduit 90 that is in fluid communication with the reservoir 20 and an inlet 100 of the aquarium 30.

Preferably the discharge means 60 includes an inverted generally U-shaped siphon conduit 110 that has an open bottom end 114 that is in fluid communication with the outlet conduit 50. The siphon conduit 110 is adapted to establish a siphon when the water 15 in the aquarium 15 reaches the predetermined maximum level established by the location of the outlet 40. As such, with the aquarium 30 fixed generally vertically higher than the reservoir 20, when the water 15 reaches the maximum level 120 in the aquarium 30, the siphon conduit 110 substantially fills with water 15 which begins to flow out through the outlet conduit 50. The water 15 at first just trickles out through the outlet conduit 50. But as the water pump 85 continues to pump water 15 from the reservoir 20 into the aquarium 30, and the water level 15 rises above the outlet 40, the siphon conduit 110 becomes primed as the water 15 flows therethrough at an ever quicker rate. Air cannot enter from the bottom of the outlet conduit 90 faster than the water 15 is entering from the inlet conduit 100, resulting in any air within the siphon conduit 110 and the outlet conduit 90 being expelled by the water 15. The pump 85 flow rate, outlet conduit 90 diameter, and siphon conduit 110 diameter are pre-selected so that the siphon conduit 110 self-primes in this fashion. Once the siphon conduit 110 is primed, the portion 70 of water 15 from the aquarium 30 is then rapidly expelled through the outlet conduit 50 until the water 15 in the aquarium reaches the open bottom end 114 of the siphon conduit 110. Air in the aquarium 30 thereafter enters the siphon conduit 110 to break the siphon.

Figure 6:
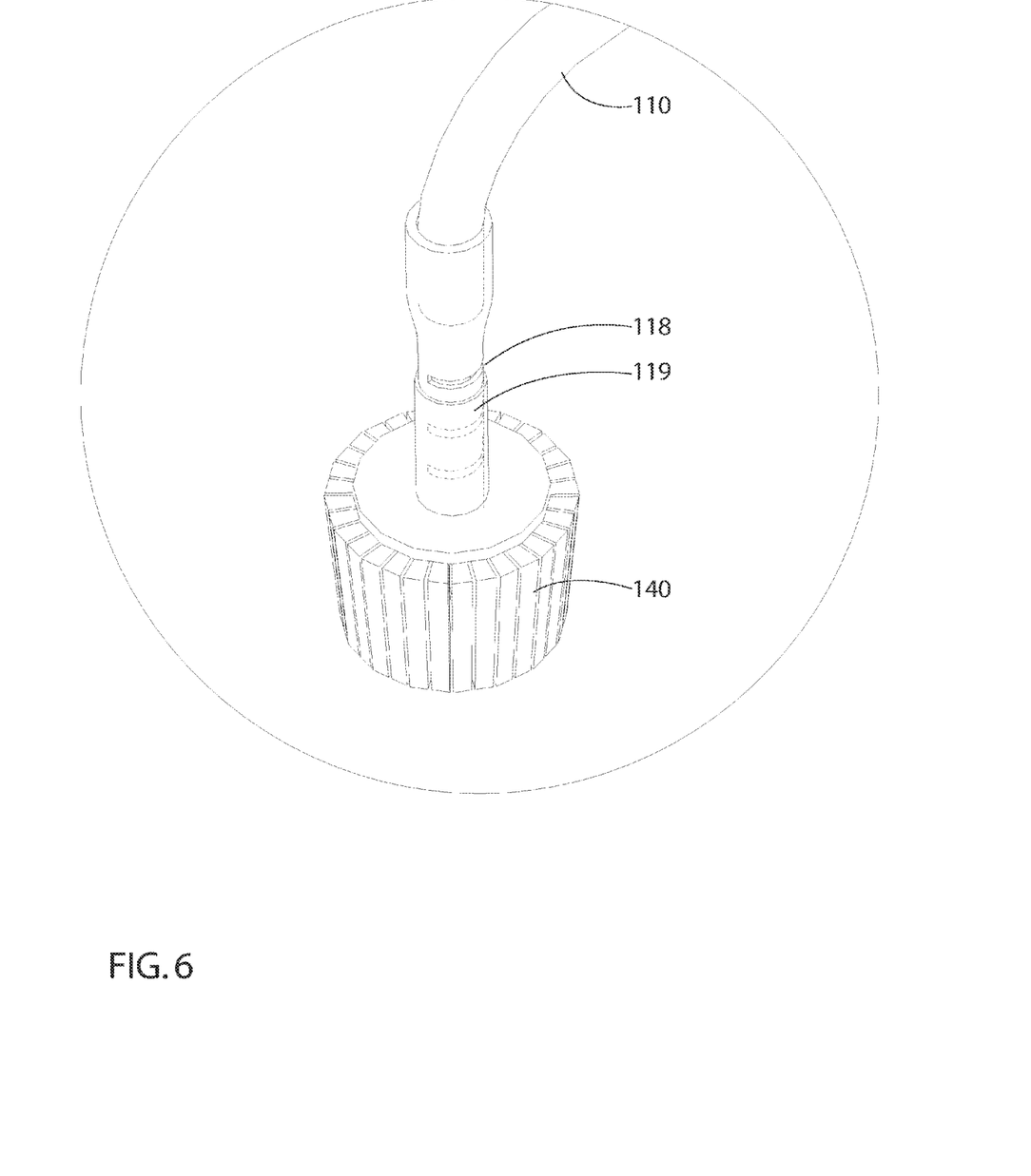
FIG. 6 is a partial perspective view of the second embodiment of the invention, taken along lines 6-6 of FIG. 5.

A screen means 140 may be included at the open bottom end 114 of the siphon conduit 110 to prevent fish or other aquatic life 18 from being pulled through the siphon conduit 110. In one embodiment of the invention, the screen means 140 may be a gravel screen 170 (FIG. 2), as is known in the art and upon which aquarium gravel (not shown) is supported. The siphon conduit 110 may further include at least one air aperture 118 that may be selectively covered by a cover 119 that is frictionally held in place on the siphon conduit 110 (FIGS. 2 and 6). As such, a range of water levels at which air enters and then breaks the siphon may be selected.

The inlet 100 of the aquarium 30 may be an aperture therein, or just the top of the aquarium 30 into which the inlet conduit 90 empties by gravity (FIG. 8), for example. The pump 85 may pump water into the aquarium 30 at a substantially even flow rate, or alternately intermittently, but preferably not faster than the siphon conduit 110 is able to conduct the water 15 out of the aquarium 30 when primed. A battery backup (not shown), and optionally a redundant water pump (not shown), may be included with the pump 85 to ensure the water 15 continues to cycle between the aquarium 30 and the reservoir 20 in the case of a power failure.

Figure 8:
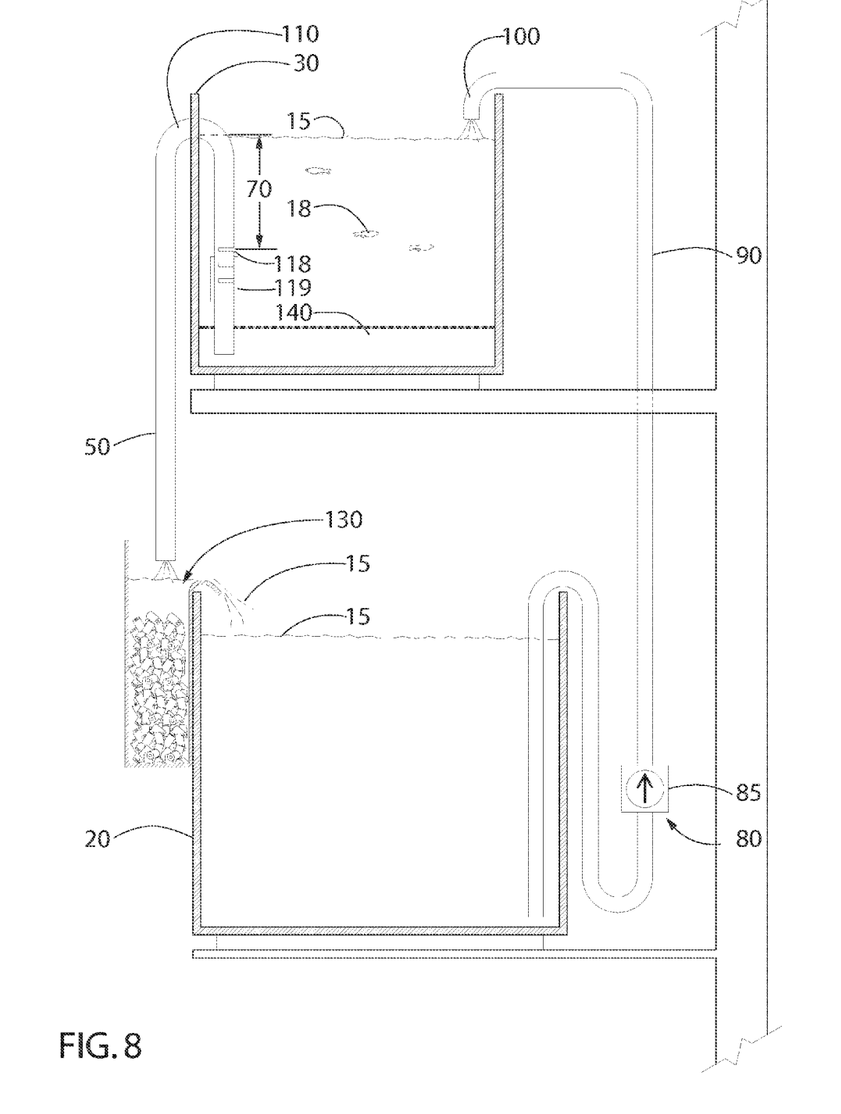
FIG. 8 is a side elevational view of an alternate embodiment of the invention.

A filter means 130 may be located in fluid communication between the outlet conduit 50 and the reservoir 20, such that water 15 discharged from the aquarium 30 is filtered before being introduced into the reservoir 20. Such a filter means 130 may be any conventional filter, such as illustrated in FIG. 8, or may be more advanced to take advantage of the water surges created by the present invention. Water 15 drawn away from the aquarium 30 may be drawn from beneath a gravel layer where debris and waste naturally collect. As such, the rapid draining of water 15 from this area serves to better pull debris and waste into the filter means 130.

As illustrated in FIG. 1, the filter means 130 may include an inclined drip tray 136 that supports a layer of filter floss 135, made from polyester fiber, for example, or other suitable mechanical filter media. Water 15 may exit the outlet conduit 50 into a pre-filter 137 for capturing most solid waste materials. Such a pre-filter 137 is preferably formed from a rigid acrylic or other plastic material lined with preferably a nonwoven polyester filter pad 131. The water 15 then flows through the filter mat 135, and optionally through a growth media 133 that supports any suitable nitrogen-consuming plant life 134, such as spouts or the like. Growth lamps 132, illustrated diagrammatically in FIG. 1, may be included to help foster growth of the plant life 134 and other beneficial photosynthetic organisms. As such, excess nitrogen is removed from the water 15, which then may flow through a layer of activated charcoal 134B or other multi-purpose chemical filter media, and porous ceramic 138, the ceramic 138 being hospitable to bacteria that further remove contaminants from the water 15. The water 15 then flows into the reservoir 20. During siphoning of the water 15 from the aquarium 30 to the filter means 130, excess water 15 may drain into the reservoir 20 through an overflow tube 139, as selected by the choice of vertical positioning thereof, the overflow tube 139 being frictionally held and positionable in an aperture (not shown) of the drip tray 136 and, optionally, the filter mat 135.

Figure 4:
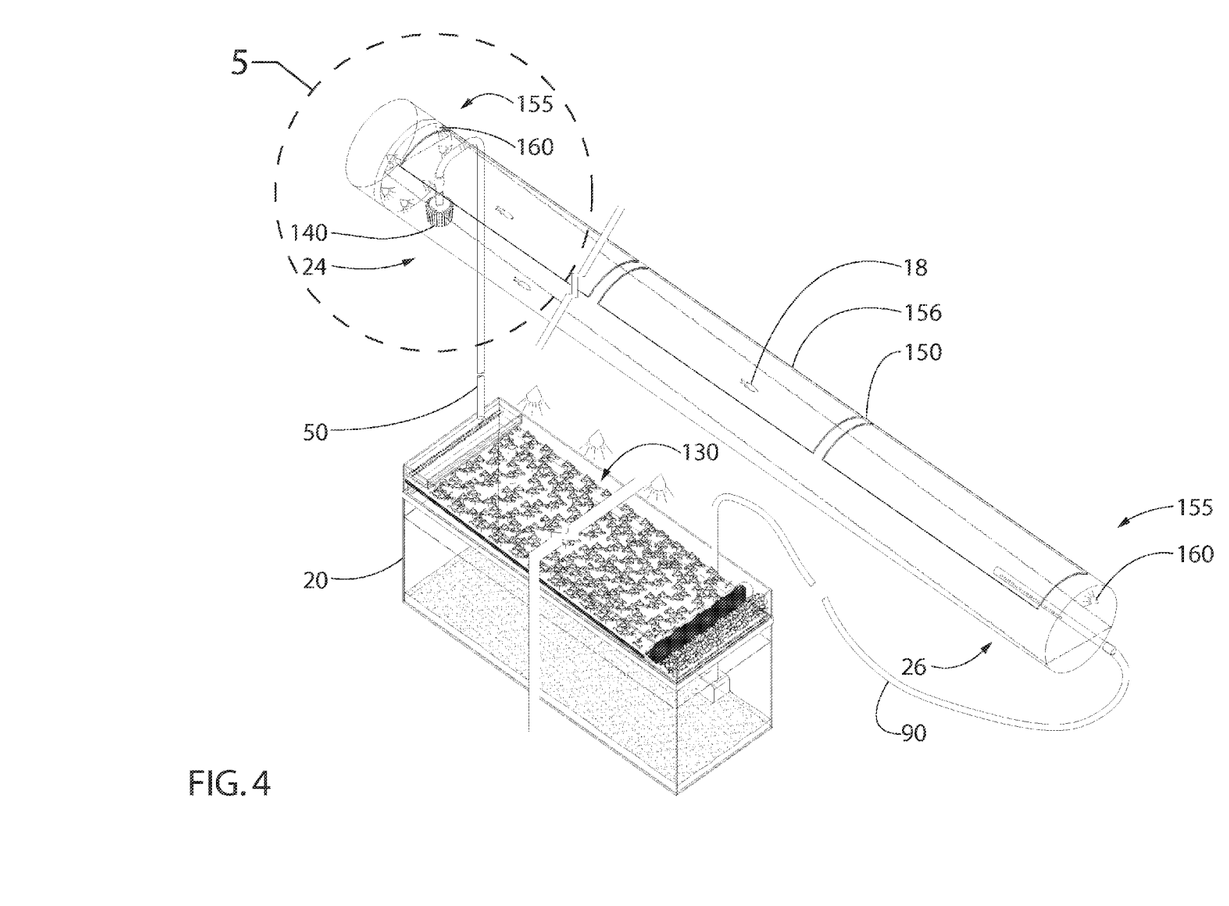
FIG. 4 is a perspective view of a second embodiment of the invention.
Figure 5:
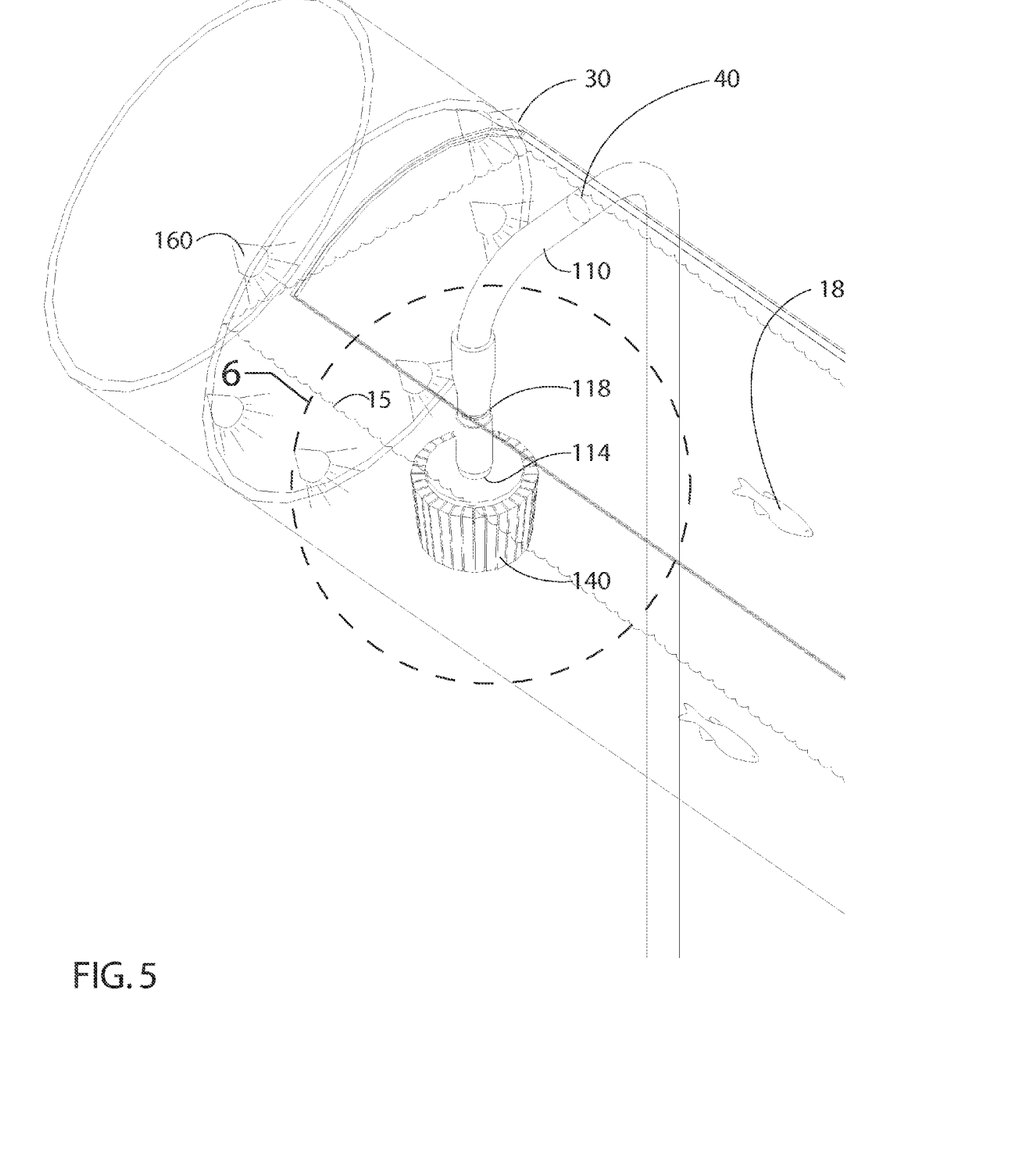
FIG. 5 is a partial perspective view of the second embodiment of the invention, taken along lines 5-5 of FIG. 4.
Figure 7:
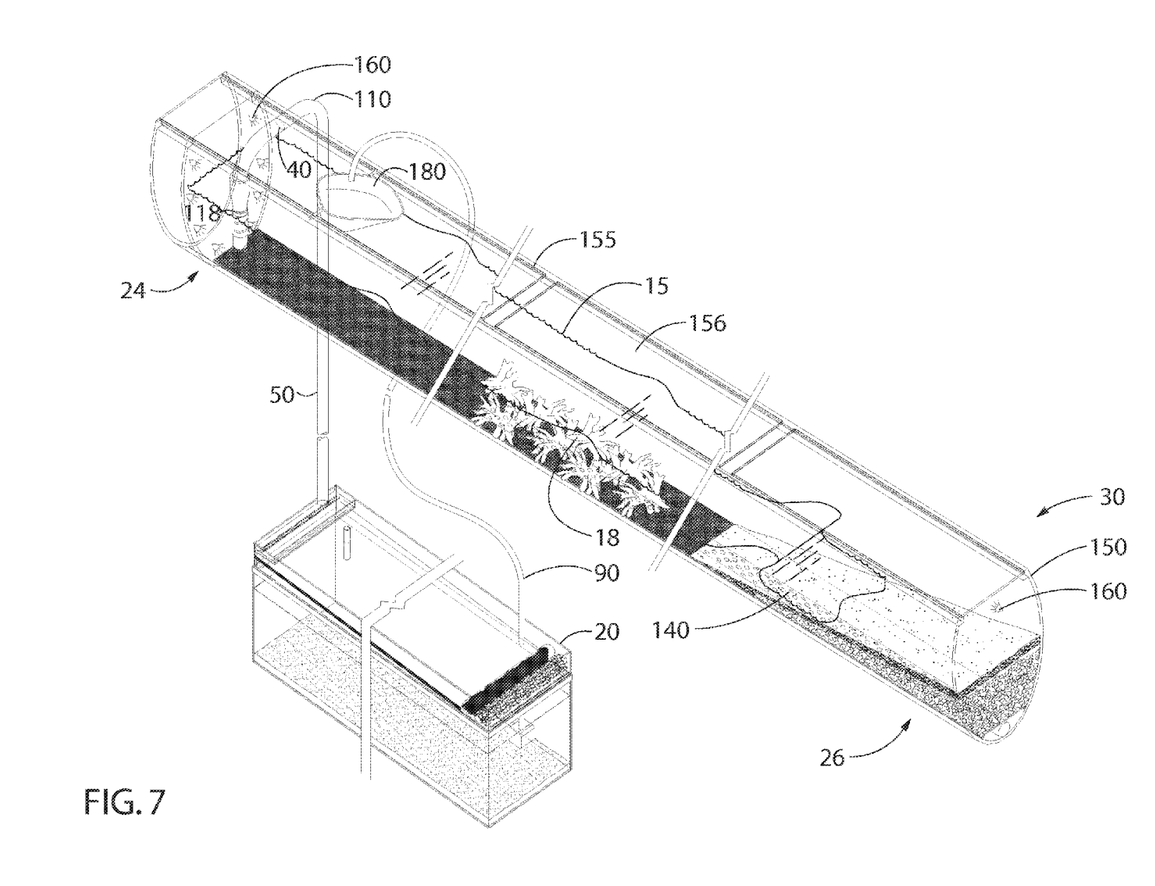
FIG. 7 is a perspective view of a third embodiment of the invention.

In a second embodiment of the invention, illustrated in FIGS. 4-6, the aquarium 30 takes the shape of an elongated, substantially transparent tube 150, preferably having at least one opening at a top side thereof that includes a removable cover 156 (FIG. 4 and FIG. 7). The tube 150 may preferably include a circular cross-section, as illustrated, but may include any other cross-sectional shape including square, oval, teardrop, rectangular, irregular, trapezoidal, or the like. Further, such a tube 150 may be formed in the shape of a U-shaped or V-shaped trough with an open top end (not shown), and may or may not have a linear longitudinal axis. In such an embodiment, the aquarium 30 may be mounted non-horizontally such that the outlet 40 is positioned proximate a lower end 24 of the aquarium 30. As such, water 15 flows generally from the inlet 100 to the outlet 40 through the tube 150, creating a river-like current through the tube 150 that emulates natural water flow conditions for the aquatic life 18. The inlet conduit 90 may include a plurality of small pre-drilled holes so that water 15 enters the aquarium 30 gently, and so that the aquatic life 18 cannot swim into the inlet conduit 90 even if the pump 85 stops and there is a sudden backflow due to the inlet conduit 90 acting as a temporary siphon. Aquatic life 18 in such an embodiment tends to be more active and interesting to view. A lamp means 160, such as a series of LEDs, illustrated diagrammatically in the figures, may be driven by a simple micro-controller (not shown) and included proximate at least one end 155 of the tube 150.

In a third embodiment of the invention, illustrated in FIG. 7, a wave surge means 180 is included for producing periodic wave surges in the aquarium 30. The raised end 26 of such an embodiment includes a "sand layer" onto which wave surges break after forming into waves. The wave surge means 180 may be a pivoting container, as illustrated, that receives the inlet water 15 from the pump means 80. Upon reaching a tipping point where the weight of the water 15 tips on an offset pivot, the container dumps the water 15 in a surge into the aquarium 30. Clearly other surge means 180 could be devised to accomplish the same effect, provided that such an embodiment emulates natural wave surges present in natural marine reef or near-shore environments. The surge means 180 may be preferentially fixed proximate the outlet 40 of the aquarium 30. When a near shore or reef environment is desired, as opposed to a shoreline environment, then the second embodiment is preferred with the wave surge means 180 fixed at the raised end 26.

With any of the embodiments disclosed, the reservoir 20 may be kept out-of-sight in a furniture base, for example, or even in another room. As such, in a salt water environment that requires the water 15 to be exposed to sunlight to promote the growth of beneficial photosynthetic organisms, the aquarium 30 may be kept apart from the reservoir 20, which may be positioned next to a window away from the aquarium 30, with no detrimental effect. Further, water conditioning plants, minerals, bacteria, so-called "live sand," plankton, or the like may be readily grown or introduced into the reservoir 20 without being disturbed by the aquatic life 18 in the aquarium 30, producing a symbiotic system that is easy to maintain.

While a particular form of the invention has been illustrated and described, it will be apparent that various modifications can be made without departing from the spirit and scope of the invention. For example, various shapes, sizes, and arrangements of aquariums 30 and reservoirs 20 may be utilized for aesthetic reasons while still maintaining the functionality of the present invention. Further, various types of surge means 180 may be utilized, as well as tube 150 shapes, lengths, and the like. Accordingly, it is not intended that the invention be limited, except as by the appended claims.

What is claimed is:

1. An aquarium system for containing water and aquatic life therein, comprising:
   a reservoir;
   an aquarium having an outlet in liquid communication with the reservoir through an outlet conduit, the outlet conduit including a discharge means for periodically discharging a portion of the water from the aquarium to the reservoir therethrough the aquarium being mounted non-horizontally with the outlet thereof positioned proximate a lower end thereof; and
   a pumping means for pumping water from the reservoir to the aquarium through an inlet conduit that is in fluid communication with the reservoir and an inlet of the aquarium.

2. The aquarium system of claim 1 further including a filter means for filtering water discharged from the aquarium before being introduced into the reservoir, the filter means located in fluid communication between the outlet conduit and the reservoir.

3. The aquarium system of claim 1 wherein the outlet conduit further includes a screen means for preventing aquatic life from passing therethrough and into the reservoir.

4. The aquarium system of claim 1 wherein the aquarium is formed from an elongated substantially transparent tube.

5. The aquarium system of claim 4 wherein the tube has a substantially circular cross-section.

6. The aquarium system of claim 4 wherein the tube has a substantially square cross-section.

7. The aquarium system of claim 4 wherein the tube has a substantially oval cross-section.

8. The aquarium system of claim 4 wherein the tube has a substantially rectangular cross-section.

9. The aquarium system of claim 4 wherein the tube has a substantially teardrop-shaped cross-section.

10. The aquarium system of claim 4 further including at least one lamp means for providing light, the lamp means fixed proximate one end of the tube.

11. The aquarium system of claim 1 wherein the pumping means is an electric water pump.

12. The aquarium system of claim 1 wherein the inlet conduit further includes a wave surge means for producing periodic wave surges in the aquarium.

13. The aquarium system of claim 1 wherein the inlet conduit further includes a wave surge means fixed proximate the outlet conduit for producing periodic wave surges in the aquarium.

14. An aquarium system for containing water and aquatic life therein, comprising:
   a reservoir;
   an aquarium having an outlet in liquid communication with the reservoir through an outlet conduit, the outlet conduit including a discharge means for periodically discharging a portion of the water from the aquarium to the reservoir therethrough, the discharge means including an inverted generally U-shaped siphon conduit having an open bottom end in fluid communication with the outlet conduit, the siphon conduit adapted to establish a siphon when the water level in the aquarium reaches a predetermined maximum level, the siphon conduit including at least one air aperture that may be selectively covered to adjust a minimum water level in the aquarium; and
   a pumping means for pumping water from the reservoir to the aquarium through an inlet conduit that is in fluid communication with the reservoir and an inlet of the aquarium;
   whereby with the aquarium fixed generally higher than the reservoir, when the water level reaches the maximum level in the aquarium, the siphon conduit substantially fills with water to draw the portion of the water from the aquarium rapidly through the outlet conduit until the water level in the aquarium reaches the open bottom end of the siphon conduit, air in the aquarium thereafter entering the siphon conduit to break the siphon.

15. An aquarium system for containing water and aquatic life therein, comprising:
   a reservoir;
   an aquarium having an outlet in liquid communication with the reservoir through an outlet conduit, the outlet conduit including a discharge means for periodically discharging a portion of the water from the aquarium to the reservoir therethrough; and
   a pumping means for pumping water from the reservoir to the aquarium through an inlet conduit that is in fluid communication with the reservoir and an inlet of the aquarium,
   wherein the aquarium is mounted non-horizontally with the outlet thereof positioned proximate a lower end thereof.

16. The aquarium system of claim 15 further including a filter means for filtering water discharged from the aquarium before being introduced into the reservoir, the filter means located in fluid communication between the outlet conduit and the reservoir.

17. The aquarium system of claim 15 wherein the outlet conduit further includes a screen means for preventing aquatic life from passing therethrough and into the reservoir.

18. The aquarium system of claim 15 wherein the discharge means includes at least one air aperture that may be selectively covered to adjust a minimum water level in the aquarium.

* * * * *